United States Patent Office 3,450,139
Patented June 17, 1969

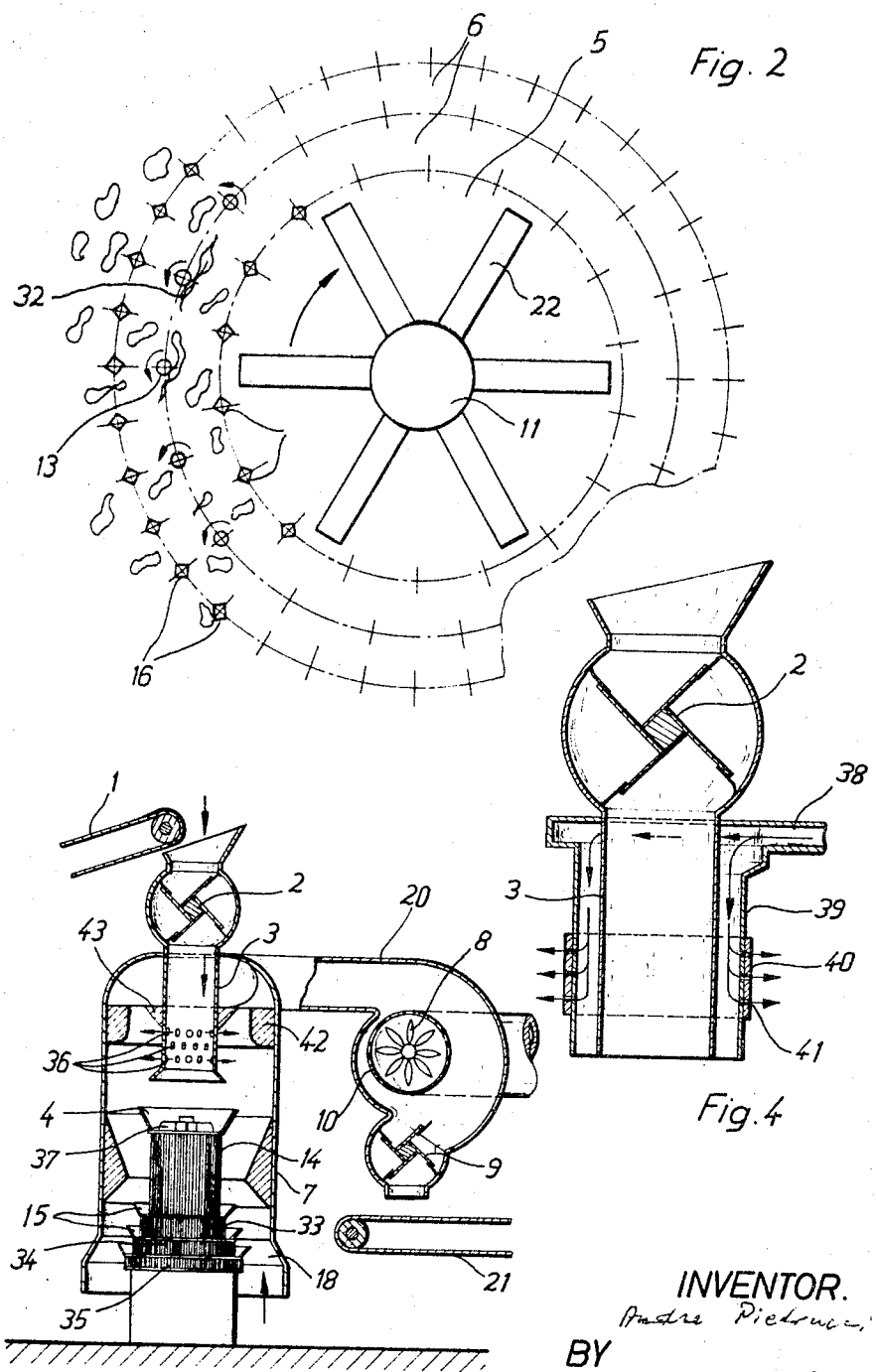

3,450,139
DEVICE FOR SEPARATING THE PARENCHYMA FROM THE WOODY PORTIONS OF PLANT LEAVES AND, IN PARTICULAR, TOBACCO LEAVES
André Pietrucci, Fleury-les-Aubrais, France, assignor to Service d'Exploitation Industrielle des Tabacs et des Allumettes, Paris, France, a French public establishment
Continuation of applications Ser. No. 425,032, Jan. 12, 1965, and Ser. No. 652,984, July 12, 1967. This application May 15, 1968, Ser. No. 732,004
Claims priority, application France, Jan. 14, 1964, 960,182; Jan. 18, 1965, 390,341
Int. Cl. A24b 5/10, 7/14; A24c 1/02
U.S. Cl. 131—146                    34 Claims

ABSTRACT OF THE DISCLOSURE

Tobacco leaves are stemmed or destalked in two or more stages by being conveyed through a series of superimposed beaters having apertured cylindrical stators surrounding toothed rotors. The diameter of each lower stator exceeds the diameter of each upper stator and the lower stators receive from the upper stators partially destalked leaves for further and more intensive stemming. The laminae are carried away by a current of air which travels upwardly in a separator disposed around the stators. The feed for admitting tobacco leaves to the uppermost stator comprises a duct which extends into the separator and a rotary distributor which disperses the leaves issuing from the duct.

---

This application is a continuation of applications 425,-032 and 652,984, filed Jan. 12, 1965, and July 12, 1967, respectively, both applications now abandoned.

The stemming of tobacco leaves is usually carried out in two combined operation:

(1) The beating or stemming operation proper, during which the parenchyma (also called laminae) is detached from the main stem or midrib. This operation is carried out in a beater, which essentially consists of a moving portion or rotor consisting of a shaft fitted with combs or teeth and rotatable about a horizontal axis, and a stationary cage-type stator unit which partially surrounds the rotor and is provided with openings or apertures which are in most cases rectangular. By means of these arrangements, the tobacco leaves which are introduced in the beater are subjected as soon as they enter this latter to a stemming action involving a series of shocks during which the parenchyma is stripped from the midribs, and then discharged together with said midribs through the openings of the cage.

(2) The separation process, which consists in dividing the stream or mixture which is delivered from the beater into two uniform streams or fractions which consist respectively of parenchyma and midribs. As a general rule, this second operation is carried out by admitting the mixture of fractions to be separated into an air stream or current which is directed upwards and at a suitable flow velocity. The flow velocity must be sufficient to carry upwards those parts which are lightest in weight, namely the fraction including parenchyma, while at the same time permitting the fraction including the midribs to fall as a result of their higher density.

In order that a stemming operation should be satisfactory, it is naturally important to ensure that the stripping of the midribs is as complete as possible, but also and above all to ensure that the strips of parenchyma which result from this operation are not too small in size.

In point of fact, it has not proved possible up to the present time to achieve this double object without at the same time increasing the number of beaters and separators and disposing these latter in chains or lines which can comprise three, four and even sometimes five beating stages, each stage consisting of one better having suitable characteristics followed by a certain number of separators. The underlying causes of such an arrangement, which calls for high capital outlay, large processing areas and high power consumption, are the defects and limitations of known designs of plant and equipment, which do not permit the possibility of achieving in a single pass the complete stripping of all the midribs while at the same time guaranteeing the production of fragments of parenchyma of suitable size.

Under the usual conditions of utilization, the beaters of known type have an efficiency which varies between 80 and 90%. In order to exceed this value, the speed of rotation can be increased or, better still, the bars of the cage or stator can be brought closer together; unfortunately, these methods have a very unfavorable influence on the size distribution of the fragments of parenchyma which are collected. Conversely, if it is desired to obtain fragments which are as large as possible, it is possible to reduce the speed of the rotor or, better still, to increase the spacing of the bars; by so doing, the products contained in the beater escape more readily, with the result that a number of leaves are discharged from the beater as a result of the added effects of gravity and centrifugal force as soon as they pass in front of the lowermost openings of the cake. There thus results a considerable reduction in efficiency.

Similarly, it is known that none of the separators at present known is prefectly efficient; as a general rule, the efficiency of separators does not exceed 60 to 70%. This is due to a number of different reasons which it will now be useful to examine.

It should be noted in the first place that, solely as a result of the fact that the parenchyma is never completely freed from the stem when processed in a beater, the stream of materials to be separated necessarily contains a third fraction including midribs to which a portion of the parenchyma still remains attached and that, depending on the size of the parenchyma which thus remains, such elements have a surface area and density which are very similar to the free parenchyma. If the separator is regulated in such a manner as to recover the entire quantity of parenchyma, there will inevitably be collected at the same time an appreciable proportion of the elements referred to; as a result, the parenchyma thus obtained will therefore contain a proportion of stem or midrib which is unacceptable. In this case also, it is therefore necessary to adopt a setting which results in a lesser degree of efficiency in order to ensure the requisite quality of product.

In addition to this cause, which incidentally cannot in any respect be attributed to the separator but to the beater which precedes the separator, a further reason for inefficient performance lies in the fact that the products are transferred from the delivery end of the beater by a conveying means (conveyor-belt, compressed-air means) in disorderly array, with the inevitable result that they obstruct each other's progress as they pass into the separator.

It can frequently be observed that stems or midribs are drawn upwards by adjacent fragments of parenchyma and, conversely, that free parenchyma is carried downwards under the action of midribs which fall downwards on top of the parenchyma. In fact, it is in order to reduce this disadvantage that the majority of manufacturers endeavor to produce a mixture of the streams which enter the separator by means of suitable devices such as winnowers, air blowers, shaking tables, and so forth. This method of operation increases the volume occupied by the material at the point of admission into the separator, with the result that the erratic movements performed by each element prior to its final downward or upward motion are substantially less affected by those of adjacent elements. However, it should be pointed out that, for the most part, the various elements of the stream are dispersed by the mixing device in a haphazard fashion; the path which a given element has to follow in order to reach the correct exit usually passes through the volume which is occupied by the other paths, with the result that such elements are still liable to catch onto other elements which are being directed to other exits.

Beaters of the type comprising a vertical shaft surrounded by a casing are already known wherein, on the one hand, the introduction of leaves is essentially concentrated in a limited peripheral zone of the beater and, on the other hand, the motion of the air is substantially horizontal. These machines do not ensure a uniform distribution of the material prior to admission thereof into the beating zone and therefore cannot perform the function of separators in an effective manner.

The object of this invention is to carry out within a single apparatus both the stripping of the heavy portions or midribs and the grading or separation of the products in as perfect a manner as possible without any of the disadvantages referred to above.

To this end, the apparatus according to the invention comprises a separator including a casing or shell which is substantially a body of revolution and, for example, of cylindrical shape, said casing being open to free air at the bottom end thereof and connected at the top end thereof to a suction means such as a cyclone to induce in the separator an ascending current of air, a beating unit consisting of at least two superposed beaters with coaxial stators dimensioned to define different acceptance ranges and rotors having vertical axes, said beaters being disposed in such a manner that one beater collects those elements which have not been stripped to a sufficient extent in the beater which is located immediately above, said beating unit being mounted in the bottom portion of said casing in such a manner as to form between the exterior of the beating unit and said casing a passageway for the upward circulation of a current of air, a feed including a duct or conduit for the introduction of products which passes through the top end of said casing and which is coaxial with the beating unit and therefore delivers said products at right angles to the beating plane through an angle of 360°, and means at the bottom end of said casing for removing the heavy products which have been stripped.

The apparatus according to the invention therefore performs simultaneously the function of multiple or multistage stripper or beater and separator while exerting a uniform and perfectly symmetrical action over its entire periphery and up to its full height.

In order to ensure uniform distribution of the products on the horizontal plane which corresponds to the input of the beating system, that is to say of the top or first beater, provision can be made for a hopper which is centrally fitted with a conical or finned distributing member. A recovery hopper can also be mounted at the top level of each beating stage, there being formed in said hopper a lateral annular intake for the purpose of recycling fractions which have not been stripped to a sufficient extent.

The beating unit can be made up of superposed beaters having downwardly increasing diameters (transverse dimensions) in such a manner that the linear speed of the teeth of rotors in said beaters also increases in the downward direction. This increase in speed from one stage to the next facilitates the stripping or stemming of products since experience has shown that, in the case of tobacco, for example, it is more difficult to strip a midrib completely as there is less parenchyma attached thereto. Furthermore, an increase in diameter from one beater to the next makes it possible at each stage to collect the major part of the fraction containing those products which have been insufficiently stripped and which have been expelled from the previous stage, or in other words to carry out a recycling of these products.

The teeth of the rotors in different beaters can be mounted on a same axis which is common to all stages and are preferably angularly displaced relatively to each other so that their free ends follow a helical curve, for instance.

The teeth of the rotors in different beaters can also be fixed on coaxial shafts which are adapted to rotate at different speeds. In fact, it is possible to adopt different speeds of rotation in different vertical beating zones. Uniform filling of the total volume of the beaters can be obtained by regulating the speed of rotation of the beater rotors in respect of a given rate of delivery of these latter as a function of the size of obstacle provided by the teeth which prevent the products from falling under the action of gravity.

The shape, number and positional arrangement of the teeth can vary from one rotor to another. At the bottom portion, for example, the teeth can be in closely spaced relation.

In order to prevent the expulsion of heavy portions, that is to say woody portions or ribs in the case of tobacco leaves, provision can be made outside the grids of the stator of each beating zone for a series of vertical or oblique rods which may either be stationary or rotatable about their axes, thus forming a cage which surrounds said stator.

The separating action, as produced on the one hand by means of the beating system which effects a wide annular mixing and on the other hand by means of the upflowing air current which circulates between the coaxial casing or shell and the stators of the beating system and which draws lightweight products (laminae) towards the upper outlet, can be effectively improved by endowing the internal surface of the casing with a shape which ensures that the cross-sectional area of the annular separation passageway is adapted in a precise manner at each level to the desired rate of separation. In this manner, those products which are delivered from one of the beaters and which have a high density but which have not been stripped to a sufficient extent are caused to fall into the following beater, thus ensuring a satisfactory recycling operation.

For the same reasons, there can be mounted on the conduit for the introduction of the products a rotary impeller which has a variable speed of rotation and which is intended to counteract the gyratory air flow generated by the rotary motion of the beaters and to permit the possibility of regulating the quantity of materials which is recycled in the top or first beater.

The efficiency of the separating process can be improved still further by providing stationarily fixed vertical guide vanes within the passage of the separator so as to damp the gyratory motion of the separating air, by providing radial-blowing nozzles disposed around the periphery of the feed duct for the purpose of blowing horizontal jets of air in the direction of the inner surface of the casing, by providing nozzles on the casing for blowing substantially vertical jets of air in direction of the axis of the apparatus, and by providing screens for the purpose of collecting the dust particles at the base of the apparatus.

The air which has to be supplied to said radial blowing nozzles can be derived from a special air circulation system or from the general air circulation system, in which case the feed duct for supplying products is connected directly to the outer air.

The means for removing the heavy stripped products can consist of radial blades mounted at the base of the beating system and of a vibratory collector, for example of annular shape.

Some embodiments of the apparatus according to the invention which is designed for beating or stemming and separating tobacco leaves have been illustrated on the accompanying drawings, in which:

FIG. 2 is a plan view on a larger scale of an alternative form of beating system of the apparatus of FIG. 1;

FIG. 3 is a diagrammatic axial sectional view of another embodiment of the apparatus according to the invention; and FIG. 4 is a detail view on a larger scale of an alternative form of the radial-blowing system of the apparatus of FIG. 3.

Figure 1:
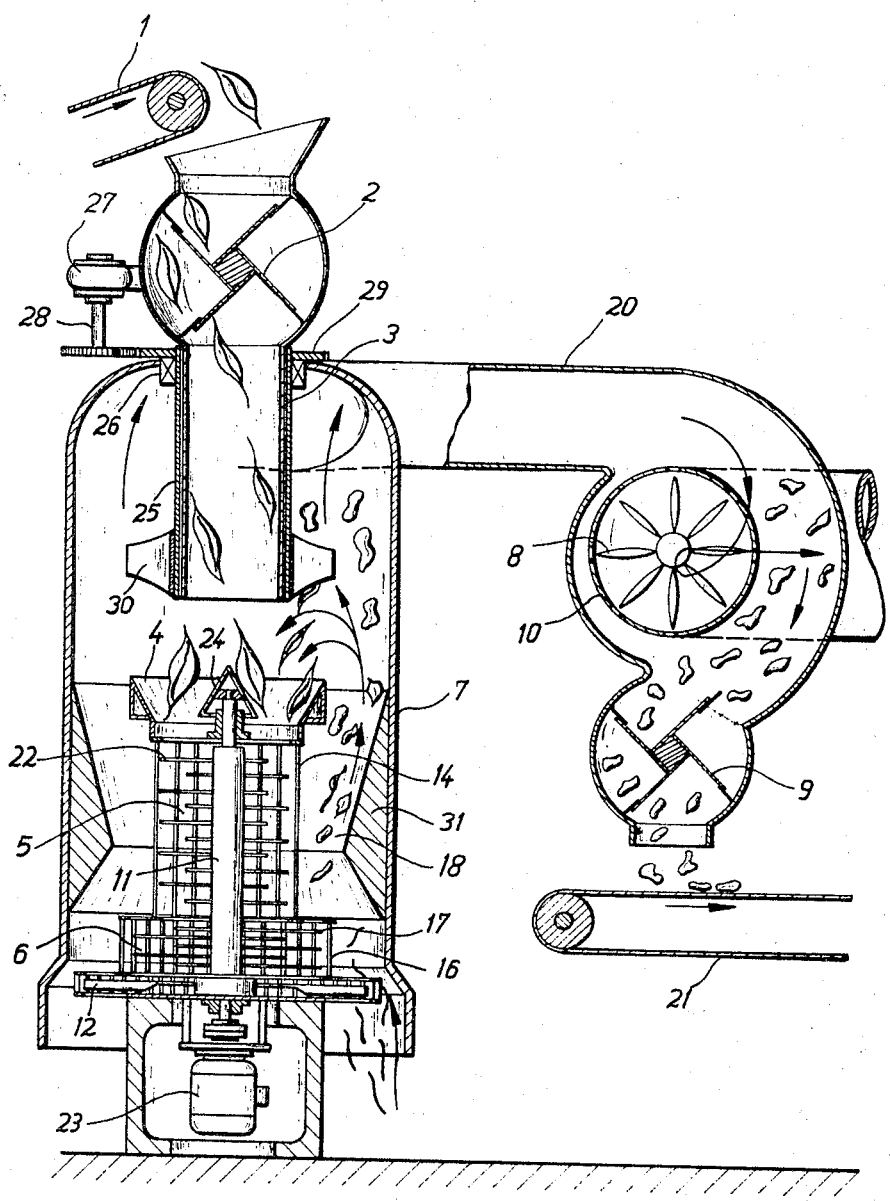
FIG. 1 is a diagrammatic axial sectional view of a first embodiment of the apparatus according to the invention.

In the example which is illustrated in FIG. 1, the apparatus comprises a separator including an upright cylindrical casing, or shell, 7 which is open to free air at the bottom and the top end of which is connected by means of a duct 20 to a cyclone 8 which is surrounded by a screen 10 and a discharge distributor 9 beneath which is installed a belt conveyor 21. The duct 20 draws a current of air upwardly through the casing 7.

A vertical feed duct 3 passes axially through the top end of the casing 7 and the bottom or discharge end of said feed duct is open whilst the top end thereof is connected to a rotary distributor 2 which receives tobacco leaves from an endless belt 1.

A guide in the form of a skirt 31 endows the internal surface of the casing 7 with the suitable profile which is required in order to obtain the results which will be described hereinafter.

A beating system is mounted in the center-line of the bottom half of the casing 7 and consists of two cylindrical apertured stators having a circular cross-section and placed one above the other, the first stator having a greater height and a smaller diameter (transverse dimension) than the second, said stators thus forming an upper beating zone 5 and a lower beating zone 6. Said stators are respectively constructed of bars 14 and 16 of square cross-sectional configuration, the spacing of which is greater in the case of the bars 14 than in the case of the bars 16.

A vertical axial shaft 11 carries the teeth or combs 22 and 17 of the rotors which cooperate with and are respectively surrounded by the two stators 14, 16.

The teeth 22 of the upper rotor are shorter and spaced at a greater distance apart than the teeth 17 of the lower rotor. It is preferable to ensure that each of these rotor teeth are each angularly displaced with respect to the following tooth in such a manner that the ends thereof are located on a helix.

Radial blades 12 are mounted on the shaft 11 at the base of the lower stator 16. A motor 23 drives the rotor shaft 11.

A feed-hopper 4 is placed above the upper stator 14 and is provided at its center with a conical distributor member 24 which is mounted on the top extremity of the shaft 11.

The feed duct 3 is surrounded by a hollow shaft 25 which is rotatably mounted in a bearing 26 fitted at the top end of the casing 7 and which is driven by a motor 27 through a system of pinions 28, 29. The shaft 25 is provided at its bottom end with a helicoidal impeller-wheel 30.

The operation of the apparatus which has just been described takes place as follows:

The stream of tobacco leaves which are brought in by the endless feed belt 1 falls into the rotary distributor 2 which causes said tobacco leaves to fall down through the feed duct 3 into the feed-hopper 4 and this latter distributes the tobacco at right angles to the beating plane and in a very uniform manner, also by virtue of the rotary distributor cone 24.

When caught by the teeth 22 of the upper rotor, the tobacco is projected against the bars 14 of the stator and and stemmed in variable proportions. At the same time, the elements of the heaviest fraction fall downwardly under the action of gravity inside the body of the stator 14, then inside the body of the stator 16. The proper speed of the rotors which depends on the spacing of the bars and on the rate of feed makes it possible to ensure a uniform filling of the body of the beaters.

The lighter fraction including fragments of parenchyma or laminae is expelled through the bars of the stators into the whole of the space which is located outside the stators 14, 16, then discharged along the separation passageway 18 through which an upflowing air current circulates at a variable velocity towards the cyclone 8 which directs the tobacco towards the distributor 9 and allows air to pass through the screen 10 toward dedusting filters which permit the air to be employed again.

The woody elements or ribs which may have passed downwards to the bottom of the stator 16 are discharged by means of the radial blades 12 which are mounted at the base of the shaft 11.

The air current which flows upwards through the passageway 18 conveys towards the outlet those parts which are either light or semi-light in weight, that is to say stems to which a portion of parenchyma still remains attached, but the proportion of these latter is relatively small by virtue of the design of the apparatus and in particular by virtue of the shape of the guide skirt 31 of the casing 7 which adapts the cross-sectional area of the annular passageway 18 to the desired speed of separation, and by virtue of the presence of two beating zones 5, 6 having diameters which increase in the downward direction.

The air current within the separation passageway 18 is enlarged at each stage and the velocity thereof decreases, thus ensuring a separating effect which is adapted to the proportion of semi-lightweight elements to be removed from each stage.

The semi-lightweight elements referred to which are drawn upwards by the air current increase in weight, as it were, with respect to the velocity of the airstream as and when the pressure of this latter decreases. Said elements can thus be recovered by the lower beater and thus be recycled.

The semi-lightweight elements which may have reached the inlet of the upper beater are taken and recycled at the level of the hopper 4 in which there prevails as a result of the enlargement of the air stream a reduced pressure which produces a vortex. This vortex diverts the semi-lightweight elements towards the hopper 4 for the purpose of recycling.

The lightweight elements which constitute the lightest fraction including laminae continue to travel upwards and are discharged through the duct 20.

As a result of its direction of rotation, the variable-speed impeller 30 counteracts the gyratory air flow which is generated by the rotation of the rotors in the beaters, facilitates the recycling process and above all makes it possible, by modification of its speed, to regulate the quantity of material which is recycled in the upper stator 14.

In the alternative form of FIG. 2, provision is made outside the stator 14 of the beating zone 5 for a set of rods 13 which are rotatable about their axes and which are located at a distance from the shaft 11 which is either shorter than or equal to the radius of the stator 16 of the stripping zone 6 and in the planes which bisect the dihedrons which are materialized by the axis of the shaft 11 and two consecutive bars of the stator 16.

The rods 13 referred to above have for their object to prevent the expulsion of the woody elements or ribs 32 which are thus introduced into the lower zone, in this case the stripping zone 6.

In the embodiment which is illustrated in FIG. 3, the apparatus is similar to that of FIG. 1 but comprises beneath the upper stator 14 three additional stators 33, 34, 35 which are mounted one above the other and the diameters or transverse dimensions of which increase from the top downwards.

The inlet of each stator is surrounded by a hopper 15 having the shape of an inverted cone and similar to the hopper 4 of the top beater. In addition, the admission duct or feed duct 3 is formed with openings 36 and is supplied with air from the general circulation system. Finally, the cone 24 is replaced by a finned distributor 37.

Vertical guide plates 42 are fixed to the inner face of the casing 7 to damp the giratory motion of the separating air and small radial guide plates 43 are mounted on the outer surface of the feed duct 3 to divide the main suction flow and to prevent the non-stripped leaves to be sucked along in the suction duct 20.

The operation of this apparatus is the same as that which is illustrated in FIG. 1 and, as is the case with this latter, the proportion of semi-lightweight elements which are discharged to the outlet is reduced to a relatively low value by virtue of the provision of a plurality of beating zones having downwardly increasing diameters and recovery hoppers 15 at the top level of each stage which form a lateral annular intake around the top stage.

At each stage, the air current becomes larger and the air flow velocity decreases, thereby permitting of separations which are adapted to the quantities of semi-lightweight elements to be removed from each stage.

Those semi-lightweight elements which are carried away by the air current are rendered "heavy" with respect to the air flow velocity in each reduced-pressure zone. Said elements can be recovered by the hoppers 15 and recycled.

The air which is sucked in through the holes 36 produces a radial blowing action which performs a function similar to that of the impeller 30 in the apparatus of FIG. 1.

In the alternative form of FIG. 4, the radial blowing is carried out by means of air supplied through a special duct 38 which has its opening in the annular portion located between the feed duct 3 for supplying products and a coaxial outer tube 39 fitted with a sleeve 40 in which holes 41 are formed. The current of air supplied by the duct 38 surges into the current of air which ascends in the casing.

As will be readily apparent, this invention is not limited to the constructional details which have been illustrated or described and which have been given solely by way of example. For instance, the means for feeding tobacco could include a conveyor other than an endless belt; the superposed stators of the beating system can have a cylindrical shape with a cross-sectional configuration other than circular or else have the shape of inverted cone frustums; the superposed stators could have the same diameter while the speed of the rotors can be designed to increase from the top rotor to the bottom rotor; the grids with bars need not be assembled together in contact with each other but in spaced relation in a vertical plane; the stator bars could have a cross-sectional shape other than square and, for instance, could be circular or polygonal.

I claim:

1. A method of stemming tobacco leaves wherein laminae adhere to ribs, comprising the steps of conveying a stream of tobacco leaves downwardly in a first path and subjecting the stream to a first stemming action to produce a first mixture of first and second fractions respectively comprising free laminae and laminae adhering to ribs with attendant expulsion of such fractions from said path; segregating the first fraction from the second fraction and conveying the second fraction downwardly in a second path; and subjecting the thus segregated second fraction to at least one additional stemming action with attendant expulsion of the resulting second mixture from said second path.

2. A method as defined in claim 1, wherein said segregated second fraction is subjected to a succession of additional stemming actions.

3. A method as defined in claim 1, wherein each of said stemming actions includes propelling the respective mixture substantially radially outwardly of the respective path and wherein said second path is offset radially outwardly with reference to said first path.

4. A method as defined in claim 1, wherein said additional stemming action effects more intensive segregation of laminae from ribs than said first stemming action.

5. A method as defined in claim 1, wherein said second mixture contains free laminae and ribs and further comprising the step of segregating free laminae from the remainder of said second mixture.

6. A method as defined in claim 5, wherein each of said segregating steps comprises directing through said mixtures an ascending current of air which is strong enough to entrain the laminae but is too weak to entrain the remainder of the respective mixture.

7. A method as defined in claim 1, wherein said segregating step comprises conveying through said mixture an ascending air current which is strong enough to entrain the laminae and some particles of said second fraction, and further comprising the step of admitting the thus lifted particles of said second fraction into said first path wherein such particles undergo at least one further stemming action to separate the ribs from laminae.

8. A method as defined in claim 7, wherein said admitting step includes guiding said air current toward said first path and reducing the speed of the air current to allow for gravitational descent of said particles of the second fraction in said first path.

9. A method as defined in claim 1, wherein said first path is a substantially vertical path.

10. A method as defined in claim 1, wherein said first-mentioned conveying step includes feeding tobacco leaves with a first current of air and said first stemming action involves breaking up the leaves simultaneously with transfer of the resulting mixture radially outwardly from said first path, said segregating step comprising conveying through the mixture an ascending second current of air which merges with said first current and is strong enough to entrain said first fraction, said second current flowing around the tobacco leaves in said first path.

11. A method as defined in claim 1, wherein said segregating step comprises conveying through said mixture an ascending current of air which is strong enough to entrain said first fraction and wherein said first-mentioned stemming action involves feeding the mixture of said fractions continuously from said first path into said current of air.

12. Apparatus for stemming tobacco leaves wherein laminae adhere to ribs, comprising a succession of beaters including a first beater, each of said beaters being arranged to subject tobacco leaves to a stemming action and each including aperture stator means and rotor means in the respective stator means for forcing the leaves through the stator means with attendant separation of laminae from ribs so as to form a mixture of first and second fractions which respectively comprise separated laminae and heavier fragments of leaves, said stator means having different acceptance ranges as considered at right angles to the axes of the respective rotor means and the stator means of a succeeding beater being arranged to receive at least a part of the second fraction of the mixture issuing from the stator means of a preceding beater; a feed for supplying tobacco leaves to said first beater; and drive means for said rotor means.

13. Apparatus as defined in claim 12, wherein the axes of said rotor means are substantially vertical.

14. Apparatus as defined in claim 12, further comprising separator means positioned to receive the mixtures issuing from said stator means and means for conveying through said separator means an air current at such velocity that the current entrains the first fraction.

15. Apparatus as defined in claim 12, wherein said beaters are disposed above each other and wherein the transverse dimensions of stator means of an upper beater exceed the transverse dimensions of stator means in a lower beater.

16. Apparatus as defined in claim 15, wherein said stator means resemble hollow upright cylinders and wherein the diameters of said cylinders are different.

17. Apparatus as defined in claim 12, wherein each of said beaters further comprises a hopper for directing the material into the respective stator means.

18. Apparatus as defined in claim 12, wherein said beaters are closely adjacent to each other.

19. Apparatus as defined in claim 15, wherein the separating action of a lower beater is more intensive than the separating action of an upper beater.

20. Apparatus as defined in claim 12, wherein said rotor means have end portions remote from their respective axes and wherein said drive means is arranged to rotate the end portions of said rotor means at different speeds.

21. Apparatus as defined in claim 12, wherein said rotor means comprise substantially radially extending teeth and wherein the teeth of said rotor means are of different length, said drive means being arranged to rotate all of said rotor means at the same speed.

22. Apparatus as defined in claim 12, wherein each of said rotor means comprises substantially radially extending teeth having end portions remote from the axis of the respective rotor means, the end portions of teeth in at least one of said rotor means following a substantially helical curve.

23. Apparatus as defined in claim 12, wherein said beaters are disposed above each other, and further comprising separator means surrounding at least a substantial part of each of said stator means, and means for inducing in said separator means an ascending current of air strong enough to entrain the separated laminae issuing through said stator means.

24. Apparatus as defined in claim 23, wherein said separator means comprises a tubular casing having an upper portion and said current inducing means comprises suction duct means connected to the upper portion of said casing.

25. Apparatus as defined in claim 24, wherein said separator means further comprises stationary guide means provided in said casing to regulate the direction of air flow in the upper portion of said casing.

26. Apparatus as defined in claim 23, wherein said feed comprises admission duct means having a discharge end located above the stator means of the uppermost beater.

27. Apparatus as defined in claim 26, wherein said feed further comprises rotary distributor means for leaves issuing from said discharge end.

28. Apparatus as defined in claim 23, further comprising duct means for admitting additional air into said separator means.

29. Apparatus for stemming tobacco leaves wherein laminae adhere to ribs, comprising apertured stator means; means for supplying tobacco leaves to said stator means; rotor means mounted in said stator means to rotate about a substantially vertical axis and to thus fragmentize and expel the resulting lighter and heavier fragments of leaves through said stator means; separator means surrounding at least a portion of said stator means to receive said fragments; means for conveying through said separator means a current of air which is strong enough to entrain at least some of the lighter fragments upwardly; and duct means for admitting additional air to said separator means.

30. A method of stemming tobacco leaves wherein laminae adhere to ribs, comprising the steps of conveying tobacco leaves downwardly; subjecting the leaves to a fragmentizing action at a stemming station to produce a mixture of lighter and heavier fragments; conveying at least a portion of said mixture substantially laterally of said stemming station into a separating zone; conveying through said separating zone an ascending current of air which is strong enough to entrain a least some lighter fragments of the mixture in said separating zone upwardly; and admitting additional air into said separating zone.

31. Apparatus for stemming tobacco leaves wherein laminae adhere to ribs, comprising aperture stator means; rotor means mounted in said stator means to rotate about a substantially vertical axis; a feed for supplying tobacco leaves to said rotor means whereby the rotor means fragmentizes the leaves and expels the resulting lighter and heavier fragments through said stator means, said feed having outlet means located above and substantially centrally of said rotor means; separator means surrounding at least a portion of said stator means to receive said fragments; and means for conveying through said separator means a current of air which is strong enough to entrain at least some of the lighter fragments upwardly.

32. A method of steming tobacco leaves wherein laminae adhere to ribs, comprising the steps of conveying tobacco leaves downwardly along a predetermined path; subjecting the leaves to a fragmentizing action at a stemming station having a central zone which receives leaves from said path and at which the leaves are converted into a mixture of lighter and heavier fragments; conveying at least a portion of said mixture substantially laterally of said central zone into a separating zone; and conveying through said separating zone an ascending current of air which is strong enough to entrain at least some of the lighter fragments in said separating zone upwardly.

33. Apparatus for stemming tobacco leaves wherein laminae adhere to ribs, comprising aperture stator means; means for supplying tobacco leaves to said stator means; rotor means installed in said stator means to rotate about a substantially vertical axis and to thus fragmentize and expel the resulting lighter and heavier fragments of tobacco leaves through said stator means; separator means surrounding at least a portion of said stator means to receive said fragments; means for circulating a current of air in a closed path a portion of which extends through said separator means and wherein the air current circulates in a direction to flow upwardly through said separator means and is strong enough to entrain at least some of the lighter fragments; and means for segregating the thus entrained fragments from the air current upstream of said separator means.

34. A method of stemming tobacco leaves wherein laminae adhere to ribs, comprising the steps of conveying tobacco leaves downwardly; subjecting the leaves to a fragmentizing action at a stemming station to produce a mixture of lighter and heavier fragments; conveying at least a portion of said mixture substantially laterally into a separating zone; circulating a current of air in an endless path a portion of which extends through said separating zone and wherein the air current circulates in a direction to flow upwardly through said separating zone and is strong enough to entrain at least some of the lighter fragments; and segregating the thus entrained lighter fragments from the air current upstream of said separating zone.

(References on following page)

References Cited

UNITED STATES PATENTS

| | | | |
|---|---|---|---|
| 1,024,832 | 4/1912 | Cox | 241—51 |
| 2,050,765 | 8/1936 | Rundell | 131—146 X |
| 2,474,314 | 6/1049 | Koehne | 241—51 X |
| 3,043,315 | 7/1962 | Verhappen | 131—146 |
| 3,046,998 | 7/1962 | Mortimer | 131—146 |
| 3,229,698 | 1/1966 | Johansson et al. | 131—146 |
| 3,310,059 | 3/1967 | Grinzinger | 131—146 |

ALDRICH F. MEDBERY, *Primary Examiner.*

U.S. Cl. X.R.

131—110; 209—133; 241—51